(12) United States Patent
Keller et al.

(10) Patent No.: US 8,494,327 B2
(45) Date of Patent: Jul. 23, 2013

(54) EXPANDED FOUR FIBER UNIT CABLE FOR INCREASED FIBER COUNT CABLES HAVING INCREASED FLEXIBILITY AND FIBER STRENGTH UTILIZATION

(75) Inventors: David Keller, Cary, NC (US); Jeff Rosenquist, Wendell, NC (US)

(73) Assignee: Nexans, Paris (FR)

( * ) Notice: Subject to any disclaimer, the term of this patent is extended or adjusted under 35 U.S.C. 154(b) by 380 days.

(21) Appl. No.: 12/907,372

(22) Filed: Oct. 19, 2010

(65) Prior Publication Data

US 2012/0093468 A1 Apr. 19, 2012

(51) Int. Cl.
*G02B 6/44* (2006.01)
(52) U.S. Cl.
USPC ........... 385/106; 385/104; 385/105; 385/109; 385/110; 385/111; 385/112
(58) Field of Classification Search
None
See application file for complete search history.

(56) References Cited

U.S. PATENT DOCUMENTS

| 4,289,375 A * | 9/1981 | Andersen et al. ............. 385/100 |
| 6,859,592 B2 * | 2/2005 | Seddon et al. ................. 385/111 |
| 2008/0232749 A1 * | 9/2008 | Rosenquist et al. .......... 385/112 |

FOREIGN PATENT DOCUMENTS

| EP | 0829742 | 3/1998 |
| EP | 2219060 | 8/2010 |
| WO | 2004081611 | 9/2004 |
| WO | 2010043623 | 4/2010 |

OTHER PUBLICATIONS

International Search Report dated Oct. 7, 2011.

* cited by examiner

*Primary Examiner* — Uyen Chau N Le
*Assistant Examiner* — Chad Smith
(74) *Attorney, Agent, or Firm* — Sofer & Haroun, LLP

(57) ABSTRACT

A fiber optic cable includes a plurality of optical fiber subunits, each of the subunits including four fiber optic elements and an enclosing jacket. A plurality of optical fiber subunit assemblies are also included, each of which includes a plurality of the optical fiber subunits and an enclosing microsheath. The subunits are stranded around one another. A sheath encloses the plurality of optical fiber subunit assemblies.

15 Claims, 13 Drawing Sheets

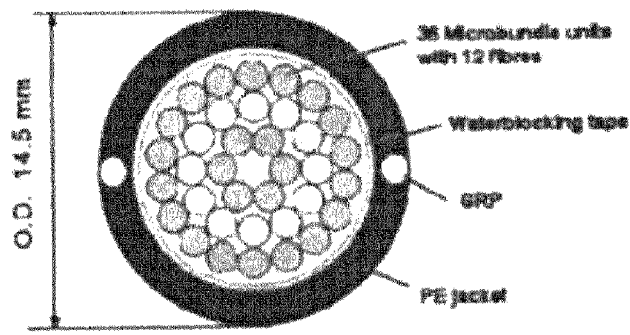
FIGURE 1A - (432 Fibers) - PRIOR ART
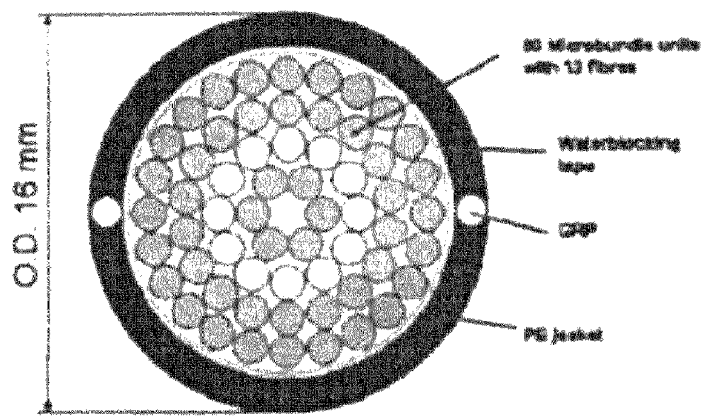
FIGURE 1B - (720 Fibers) - PRIOR ART
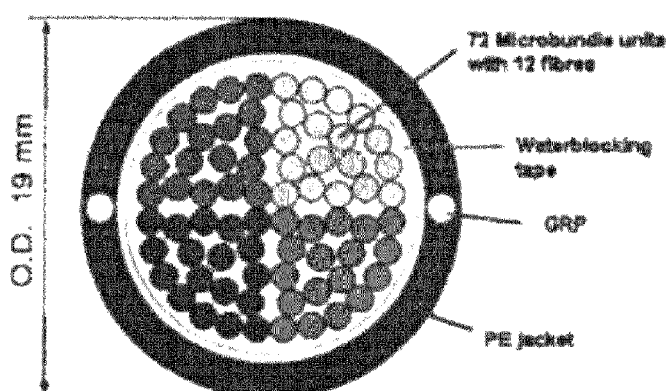
FIGURE 1C - (864 Fibers) - PRIOR ART

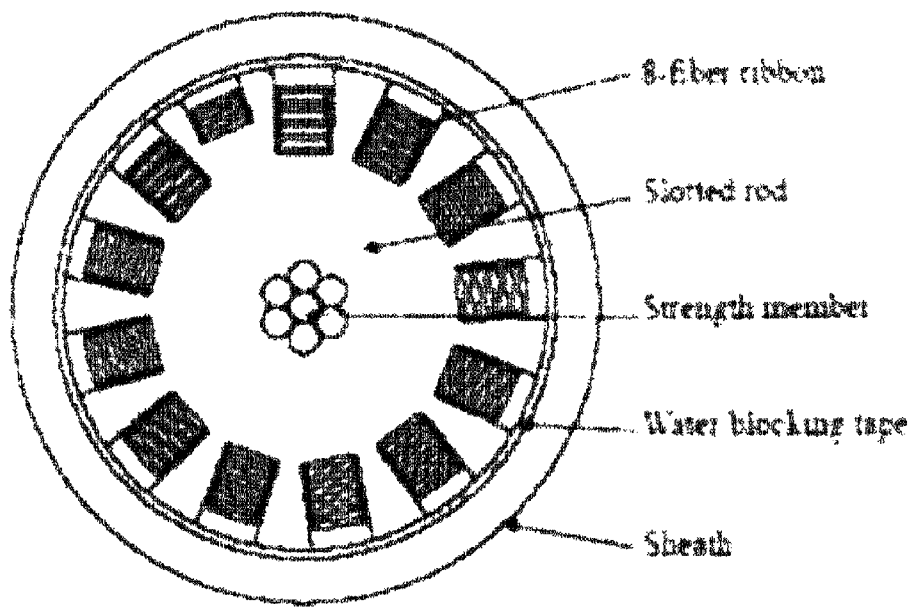
FIGURE 2 - (1000 Fibers)
PRIOR ART

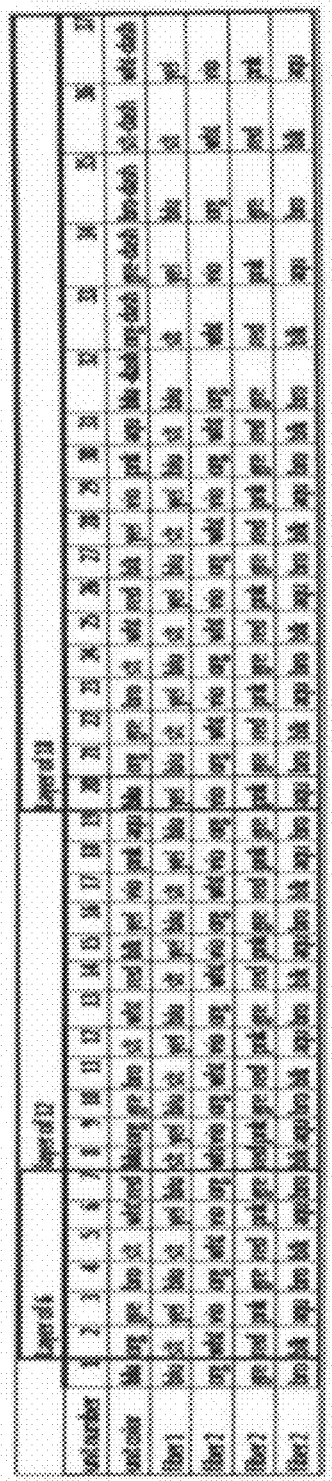

EXPANDED FOUR FIBER UNIT CABLE FOR INCREASED FIBER COUNT CABLES HAVING INCREASED FLEXIBILITY AND FIBER STRENGTH UTILIZATION

FIELD OF THE INVENTION

The present application relates to fiber optic cables. More particularly, the present application relates to the construction of large fiber optic cables.

DESCRIPTION OF RELATED ART

Currently high fiber count cables (e.g. containing over 100 fibers) tend to have larger outer diameters and are typically constructed in robust manner. For example, such cables may be constructed as ribbon cables having stacks of ribbons or loose fibers in slotted cores or large tubes.

Other arrangements having tight bundles of twelve fiber units have been tried, but such arrangements require highly bend resistant fibers because of the stresses inherent to such fiber groupings. The highly bend resistant fibers mask the inherent stress on the fiber in this design and may result in fiber breaks over the long term.

Additionally, in an attempt to reduce the stress on the ribbons or tight bundles of twelve fiber units, strength members are utilized. Although this may have certain stability advantages, it tends to make these high fiber count cables even stiffer and more difficult to bend. Thus, although the optical cables are otherwise functional, they are not well suited to confined spaces that often require tight bending, even though there is a large need for such high fiber count cables in server farms and other such confined spaces.

For example, the following TABLE 1 shows a series of FOTP (Fiber Optic Test Procedures) that such high fiber count fiber optic cables may be subject to. These are standard test procedures developed and published by the Electronic Industries Association (EIA) under the EIA-RS-455 series of standards. Additionally, the server farm bend expectations exceed the Standard Test Procedures, where more flexibility is desired. The cable should lay compliantly in a routing tray or trough and not have the spring like desire to straighten out if unconstrained.

TABLE 1

| Test Description | Test Procedure | Test Description and Result Requirements |
| --- | --- | --- |
| Hot Bend | FOTP-37A | 60° C., 150 mm mandrel Attenuation Change ≦ 0.30 dB |
| Cold Bend | FOTP-37A | −30° C., 150 mm mandrel Attenuation Change ≦ 0.30 dB |
| Impact Resistance | FOTP-25C | 12.5 mm hammer radius, 5.88 N-m Impact energy Attenuation change ≦ 0.30 dB |
| Cold Impact Resistance | ICEA-596 FOTP-25C | 12.5 mm hammer radius, 2.94 N-m Impact energy Temperature: −10° C. Attenuation change ≦ 0.30 dB |
| Compressive Strength | FOTP-41A | 110 N/cm for 10 minutes. Attenuation change ≦ 0.30 dB |
| Tensile Loading & Bending | FOTP-33A | 2670N, ≦ 56 cm mandrel. Attenuation change ≦ 0.30 dB |
| Twist | FOTP-85A | 1.0 meter twist length. Attenuation change ≦ 0.30 dB |
| Cable Flexing | FOTP-104A | 150 mm sheave, 100 cycles. Attenuation change ≦ 0.30 dB |
| Jacket Tensile Strength and Elongation | FOTP-89A | Test Aged and Unaged Jacket Minimum Tensile: 2000 psi Minimum Elongation: 100% |
| Jacket Shrinkage | FOTP-86A | 6" samples @ 110° C. for 2 hours Maximum Shrinkback < 5% |
| Jacket Stress Crack Resistance | ASTM D 1693 | 50° C. for 48 hours The jacket shall show no signs of cracks and splits |
| Temperature Cycling | FOTP-3 | −40° C. to +75° C. Maximum Attenuation < 0.60 dB |
| Cable Aging | FOTP-3 | −0° C. to +75° C. (After 7 Days) Maximum Attenuation < 0.50 dB |
| Color Permanence Cable Freezing | FOTP-98 Method A | Cable submersed in water at −2° C. for 24 hours. No cracks or splits on jacket. Attenuation change ≦ 0.30 dB |

FIGS. 1A-1C shows a prior art arrangement for assembling high fiber count optical fiber cables using a number of twelve-fiber subunits within an outer jacket. The jacket includes 2 embedded GRP (Glass Reinforced Polymer) strength members.

FIG. 2 shows a another prior art arrangement for assembling high fiber count optical fiber cables using a slotted core design. This arrangement results in a stiff cable due to its shape and dimensions.

OBJECTS AND SUMMARY

The present arrangement provides a compact high fiber count fiber optic cable for use for example in server farms or in fiber-to-home applications that requires a increased flexibility, reduced stiffness, inherently less stress on the fiber, and smaller diameter than prior art solutions. The cable has a reduced outer diameter (with little or no added strength members) with minimal induced stress on the fibers, while retaining good buffer tube stripabilty.

In one embodiment a high fiber count optical fiber cable has a loose tube construction with four fibers per buffer tube as a basic unit. These basic units are then arranged within larger sub-units (e.g. sixteen fibers from four—four fiber units; forty eight fibers from twelve—four fiber units or one hundred and forty eight fibers from thirty seven—four fiber units, etc. . . . ) which are then compiled assembled into a fiber optic cable core to be coated with an outer jacket.

In one arrangement, the use of basic units composed of four fibers per buffer tube maintains good fiber/cable flexibility, as this design prevents fiber cross over during cable flexion.

Moreover, when using many four fiber/per tube sub-units, each tube is stranded together into larger high fiber count cables. The overall cable arrangement allows the fibers themselves to be uniformly stressed so that they act in concert to fully utilize the fiber strength and meet the necessary strength requirements using the fiber strength alone, without the need for any added strength members.

In another embodiment, the use of an additional mold-release/release/slip agent on the fibers within the buffer tube allows the cable to maintain tube stripability requirements even with the tighter buffer tubes. (stripability refers to a test that measures the ability to mechanically remove the tube for a certain distance without exceeding a threshold force)

In another embodiment, the increased density of the fuel component (for fire ratings) may be offset using novel polymer blends including BHBD (bishydroxydeoxybensoin) and PPDC (polyphosphonates).

Accordingly, the present arrangement is directed to a fiber optic cable having a plurality of optical fiber subunits, each of the subunits including for example, four fiber optic elements and an enclosing jacket. A plurality of optical fiber subunit assemblies each have a plurality of the optical fiber subunits and an enclosing micro-sheath. The subunits are stranded around one another and a sheath encloses the plurality of optical fiber subunit assemblies.

BRIEF DESCRIPTION OF THE FIGURES

The present invention can be understood through the following description and accompanying drawings, wherein:

FIGS. 1A-1C show prior art high fiber count fiber optic cables using a twelve fiber per tube design;

FIG. 2 shows a prior art high fiber count fiber optic cables using slotted core design;

FIG. 13 shows a table of color charts in accordance with one embodiment.

DETAILED DESCRIPTION

Figure 3:
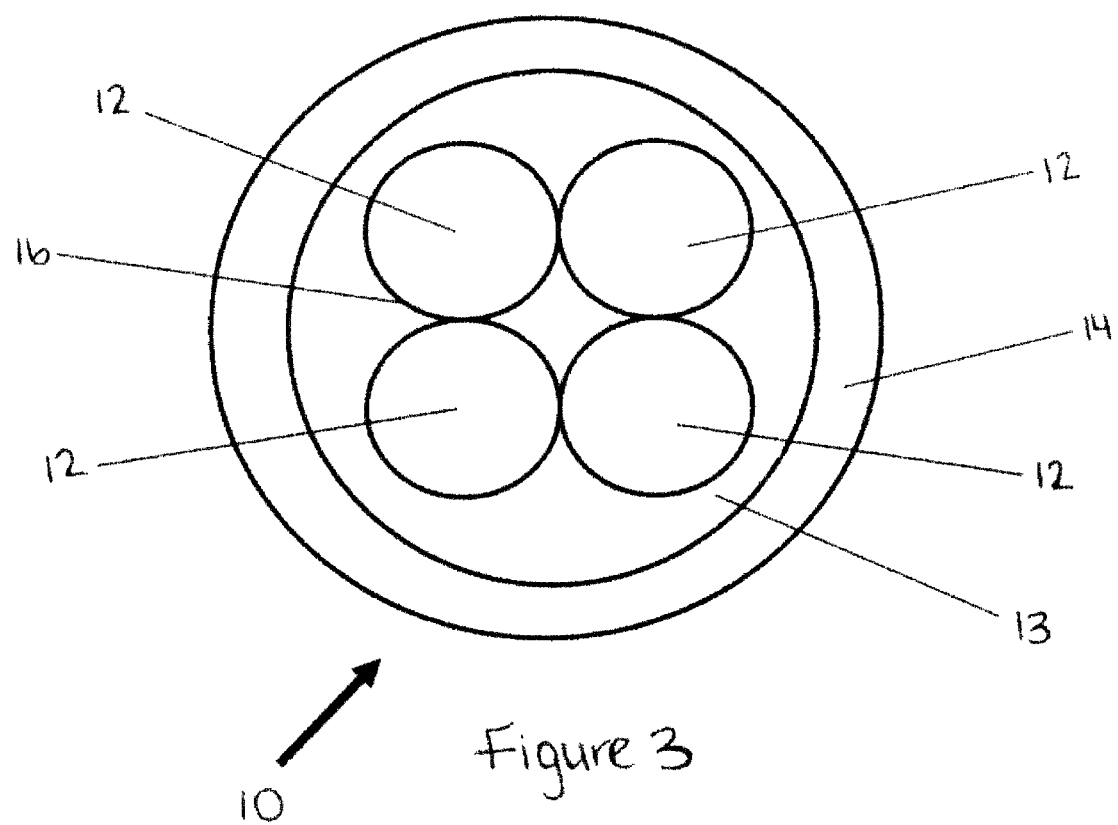
FIG. 3 shows a fiber subunit in accordance with one embodiment.

In one embodiment as shown in FIG. 3 a basic subunit 10 is shown having four fibers 12 inside. In the present arrangement fibers 12 are typical UV coated optical fibers with 250 microns (0.25 mm) diameter. However, larger tight buffer fibers (600 micron to 900 micron) may also be used in each of the below described cables. Fibers 12 may have a typical tensile rating requiring about 430 grams of tension to reach the typical safe elongation target of 0.5%, however they may be of later designs that can withstand 0.6% to 1% elongation (under even greater grams of tension).

Around the four squarely arranged fibers 12, is a polymer jacket 14 to form subunit 10. Jacket 14 may be made from PVDF (Polyvinylidene Fluoride) or FEP (Fluorinated Ethylene Polymer), or other non-halogenated polymers including polypropylene (PP), FRPVC (Fire Resistant Polyvinyl Chloride) or polyethylene (PE) that have good fire resistant properties (such as FR versions of PE or PP). This polymer selection helps with meeting fire rating standards for such high fiber count optical fiber cables, such as the UL 1666 (Riser) and UL 262 (Plenum) ratings which are difficult to meet in high fiber count cables owing to the added fuel inherent in the larger cable designs.

In another arrangement, BHBD (bishydroxydeoxybensoin) alone or mixed with PPDC (polyphosphonates), may be used as alternative polymers, in combination with other polymers for jacket 14 of subunits 10 to take advantage of their improved smoke and fire resistance qualities.

Returning to the dimensions of jacket 14 and subunits 10 in general, as noted above in FIG. 1, prior art cables use twelve fiber tubes as the smallest loose "subunits" in high fiber count constructions. The present arrangement uses four fibers 12 per subunit 10. Such four fiber subunits do exist in other fiber cable applications. However, such prior four fiber units have typical dimensions of 0.025" inner diameter (ID) and 0.042" outer diameter (OD).

To improve of the flexibly and robustness of the overall high fiber count cable (as discussed in more detail below), the present dimensions for subunit 10 and jacket 14 include an 0.025" internal diameter and a substantially 0.040" outer diameter resulting in a substantially 0.0075" tube/jacket 14 wall thickness.

In this arrangement, with the four fibers 12 (each having an OD of 0.250 mm) a theoretical circle drawn around the four fibers 12 would have an approximate diameter of (0.603 mm) 0.02374" inches, which when compared against the ID of jacket 14 (0.025" leaves a 0.00063" inch (0.016 mm) gap 13 between jacket 14 and fibers 12 in subunit 10. Owing to this very tight, but still somewhat loose arrangement, fibers 12 may still rearrange and move relative to jacket 14, e.g. as subunit 10 bends, but the arrangement is still tight enough to prevent overlapping or jumbling of fibers 12 which would otherwise lead to unwanted signal attenuation.

In an alternative arrangement, the thickness of jacket 14 may be further reduced from 0.0075" to 0.003 to 0.006 inches (or 0.076 mm to 0.152 mm) by keeping the ID of 0.025" about the same, but reducing the OD to 0.038" from 0.040" over fibers 12 of subunit 10.

In another alternative, gap 13 between fibers 12 and jacket 14 may be reduced from 0.00063" (0.016 mm) by about 0.0002" to 0.0004" inches, by reducing the ID of jacket 14 down from 0.025". In such an arrangement, a release agent layer 16, such as dichlorofluoroethane, in a thickness of 0.00005" to 0.0001" inch (0.00127 to 0.00254 mm) may be added to ensure that even though fibers 12 are closely held in jacket 14 they can still move and so that jacket 14 can be stripped without damaging fibers 12.

Such a release agent layer 16 may be applied using either thin die coat or atomized mold-release agent which, as noted above, improves stripability of jacket 14 from fibers 12 thereby allowing the further reduction in jacket 14 thickness and necessary ID space/gap between fibers 12 and jacket 14. Such release agent layer 16 may be applied with a solvent carrier applied through coating dies or a fogging box and then through a dryer to facilitate the creation of thin layer 16 having a thickness, for example between 1.0 and 3.0 microns.

In an alternative arrangement, silicone can be used as an optional release agent for layer 16 that can be applied to fibers 12 just before entering the extrusion of jacket 14. Also, optical fiber ultra-violet curable ink, used on the surface of fibers 12, may be of the type that includes approximately 1% of silicone or release agent to render a release function when incorporated into jacket 14.

Figure 4:
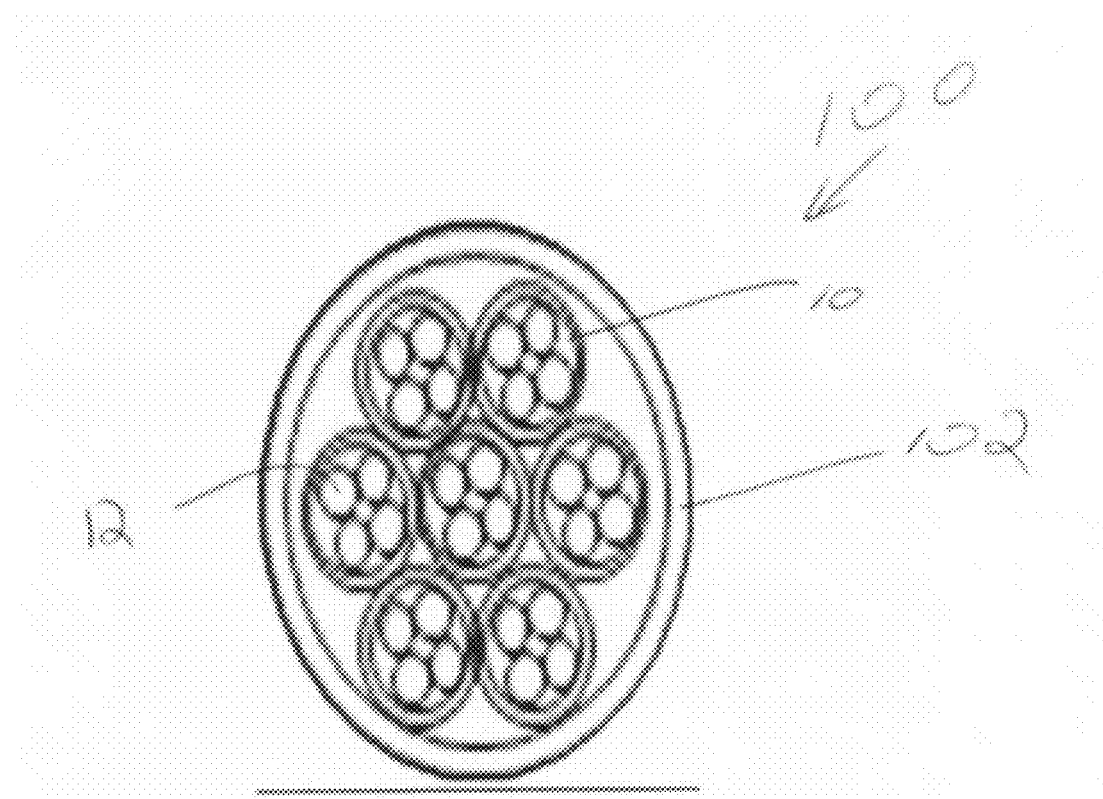
FIGS. 4-8 show exemplary fiber subunits bundles, in accordance with one embodiment.

Using the above described building block of subunits 10, as shown in FIG. 3, larger subunit bundles 100 are created by applying a micro-sheath 102 around some quantity of subunits 10. For example, as shown in FIG. 4, to create a twenty eight fiber subunit bundle 100, six subunits 10 are provided around a central subunit 10 (six around one design, total of seven subunits 10) resulting in one subunit bundle 100 of twenty eight fibers 12.

Assuming from the above embodiments that the outside diameter of each subunit 10 in the twenty eight fiber subunit bundles 100 is 0.038" inches, the outside diameter in inches of subunit bundles 100 is substantially 0.143". Micro-sheath 102 used to form subunit bundle 100 may be made from similar polymers discussed above for jacket 14 and would be approximately 0.003-0.007" in thickness. In addition to fiber subunits 10 being within subunit bundles 100, additional amounts of WS (Water Swellable) powders 104, of about 1-50 microns may be interspersed between subunits 10.

In additional embodiments, subunits 10, as shown in FIGS. 5-8, different sized subunit bundles 100 are created from applying a similar micro-sheath 102 around a number of subunits 10.

Figure 5:
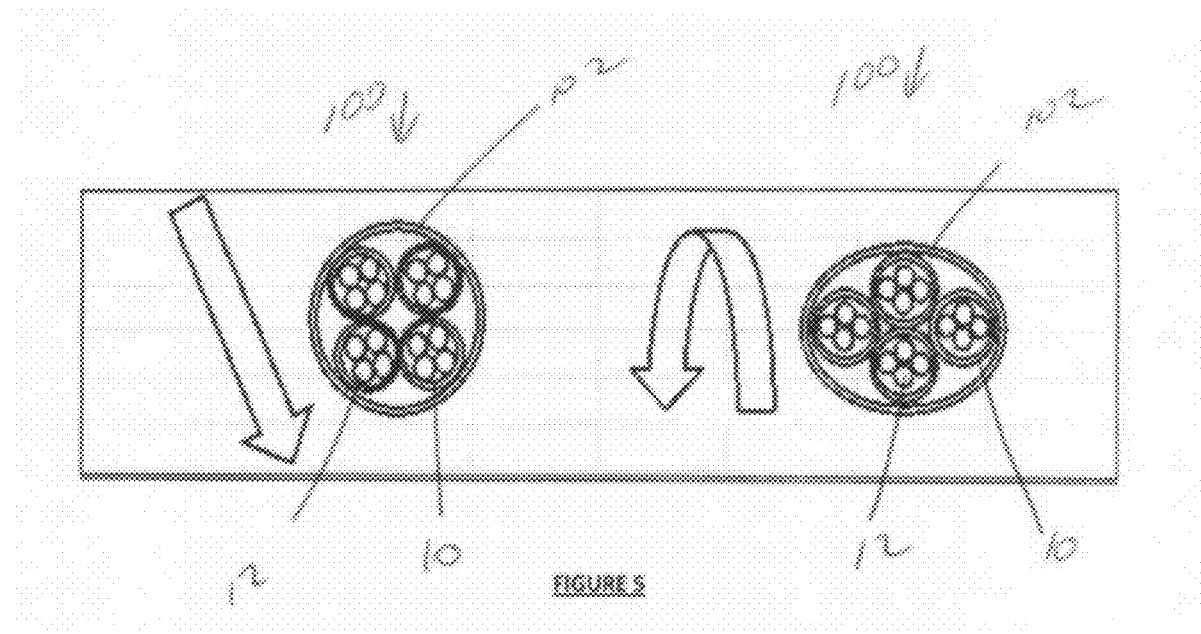

For example, for even more confined spaces such as an MDU (Multi-Dwelling Unit) or a small rectangular pedestal usually inter-dispersed in a neighborhood, a smaller sixteen fiber subunit bundle 100 may be used as shown in FIG. 5. This subunit bundle 100 has four subunits 10 that are provided in a substantially square arrangement resulting in one subunit bundles 100 of sixteen fibers 12. Such an arrangement may be used for small high fiber count cables, e.g. in the range of 100-400 fibers. This arrangement may have improved flexing and crush resistance owing to its square shape, which allows the element sets and subsets to shift within.

Because of its smaller size the arrangement of a sixteen fiber 12 subunit bundle 100 may be ideally used with 250 micron, 600 micron or 900 micron sized fibers 12. Jacket 14 may have a thickness of 0.003" to 0.007" used to encapsulate the four fibers 12 and micro sheath 102 may also have a similar thickness of 0.003" to 0.007".

This arrangement may also have added traces of 1-50 micron water swellable powder disposed between micro-sheath 102 and jacket 14 of subunit 10. In another arrangement, 1-10 micron WS power traces may also be used within jacket 14 of subunit 10 to prevent water ingress. For larger 600 to 900 micron fibers 12 with subunit 10, 1-50 micron WS power is used.

In this embodiment, the sixteen fiber 12 subunit assembly 100 has an optimized design symmetry for bending and flexibility and lower fiber stress through position redistribution of the optical fibers as shown in FIG. 5.

Figure 6:
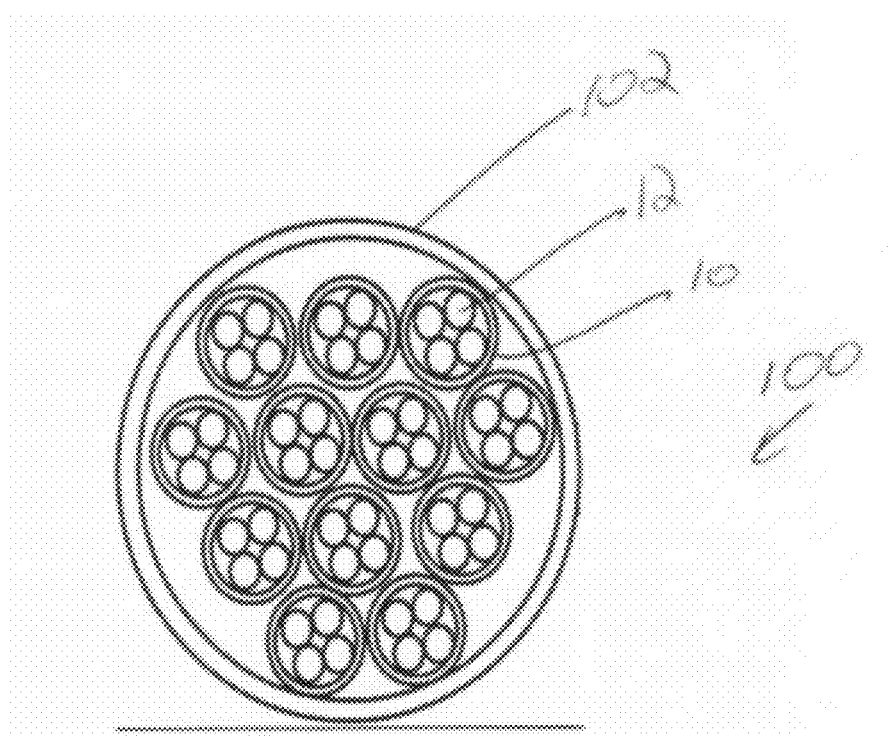

In another example in FIG. 6, to create a larger forty eight fiber subunit bundle 100, twelve subunits 10 are provided in an arrangement of nine subunits 10 around three central subunits 10 (nine around three design) resulting in one subunit bundles 100 of forty eight fibers 12. Such an arrangement may be used for 1000+ high fiber count cables.

Figure 7:
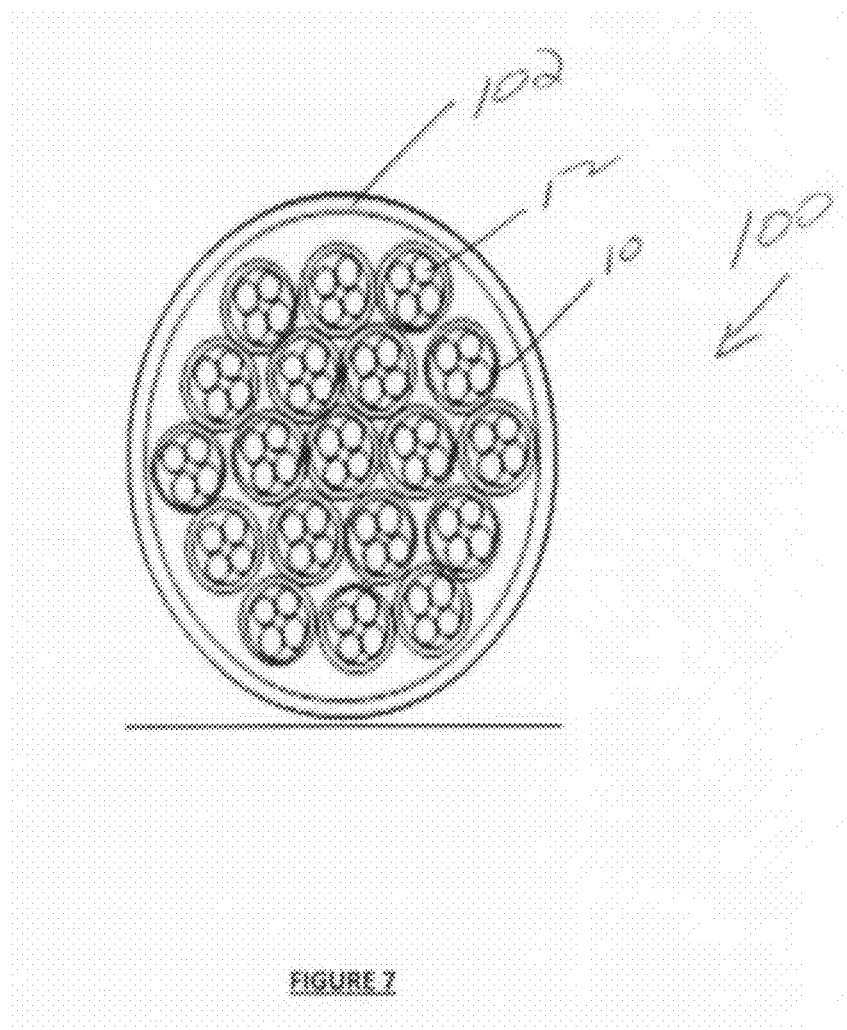

In another example in FIG. 7, to create a larger seventy six fiber subunit bundle 100, nineteen subunits 10 are provided in an arrangement of twelve subunits 10 around six mid-level subunits 10 which are in turn around one central subunit 10 (twelve around six around one design) resulting in one subunit bundles 100 of seventy six fibers 12. Such an arrangement may be used for 2000+ high fiber count cables.

Figure 8:
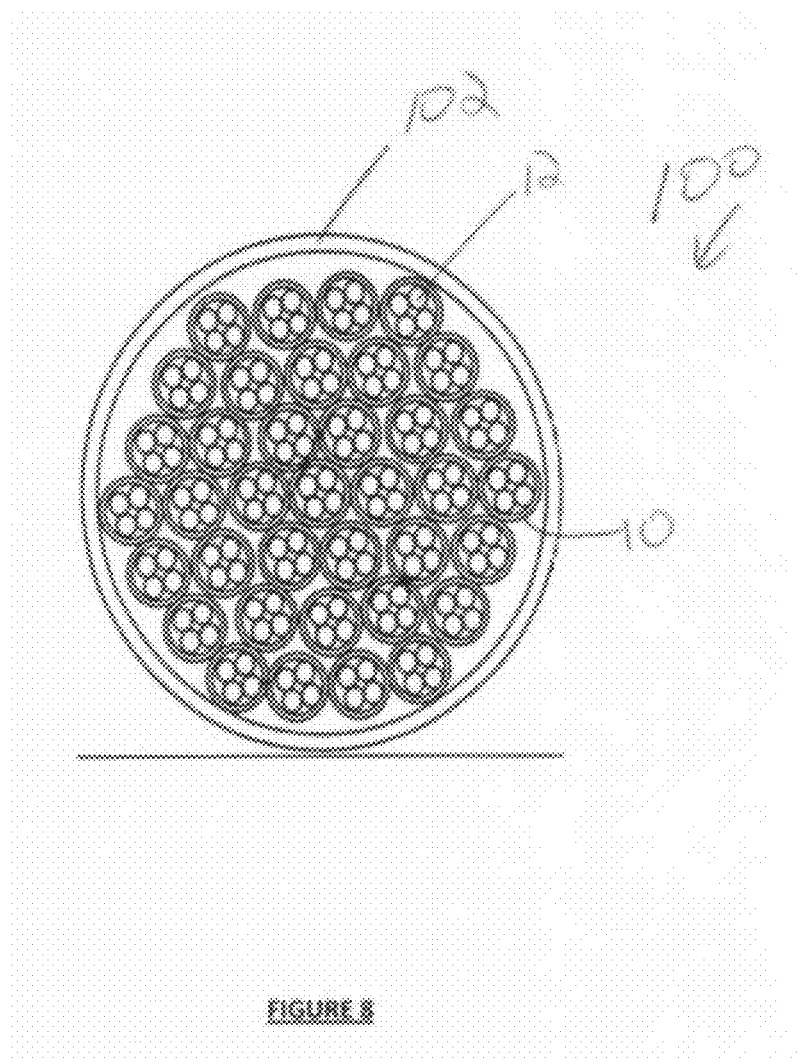

In another example in FIG. 8, to create a larger one hundred and forty eight subunit bundle 100, thirty seven subunits 10 are provided in an arrangement of eighteen subunits 10, around twelve first mid level subunits 10, around six second mid-level subunits 10 which are in turn around one central subunit 10 (eighteen around twelve around six around one design) resulting in one subunit bundles 100 of one hundred and forty eight seventy six fibers 12. Such an arrangement may be used for 5000+ high fiber count cables.

Each of these subunit bundle arrangements 100 shown in FIGS. 4-8 are used to group the smaller four fiber subunits 10 into larger subunit bundles 100 with a small micro sheath 102 that allows for simultaneously densely packing a large number of optical fibers 12 into a small space while providing an organization/arrangement that allows for the fibers to be bendable without exceeding attenuation limits. Moreover, as explained in more detail below, the structure of densely packed fibers 12 allows for a high fiber count fiber optic cable construction that does not require any independent strength members apart from fibers 12 themselves.

Figure 9:
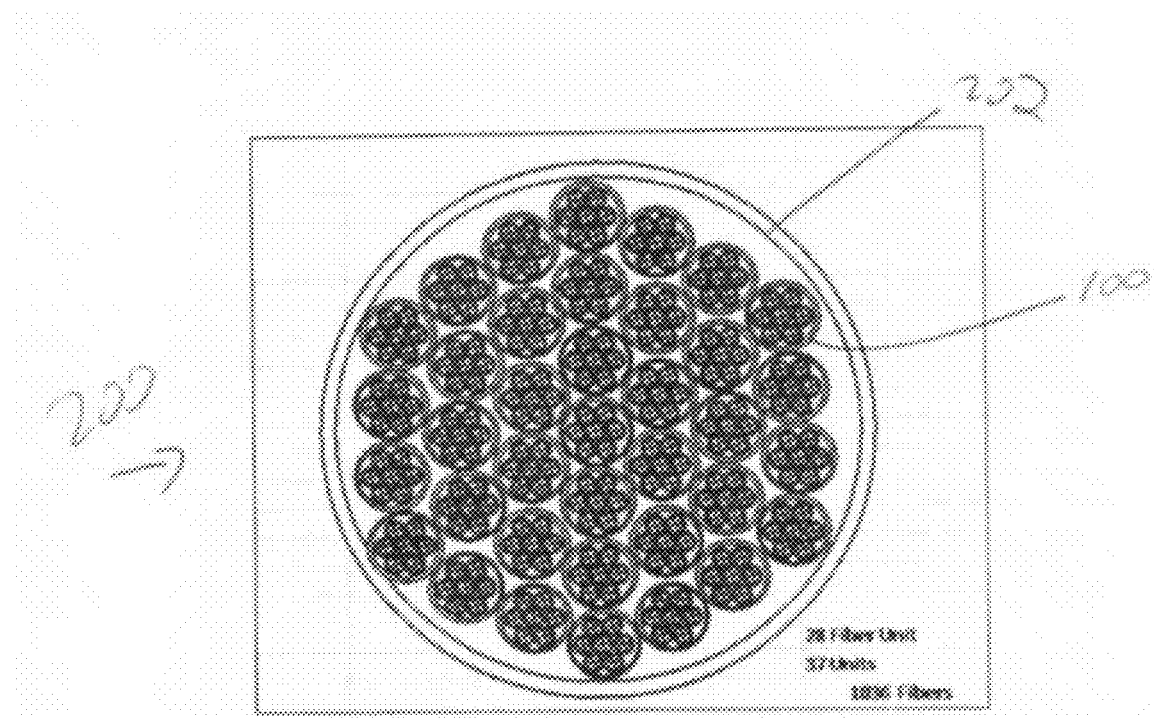
FIG. 9-12 show exemplary high fiber count optical fiber cables, in accordance with one embodiment.

Turning to the construction of a completed cable 200, FIG. 9 shows an exemplary cable 200 made from thirty seven fibers subunit bundles 100 each having twenty eight fibers 12 therein, as per the example given in FIG. 4 above resulting in a cable 200 that has one thousand thirty six fibers 12. The following table 2, combined with FIG. 9 shows the relevant concentric arrangement of subunit bundles 100 within a larger jacket 202 that forms the outer insulation of cable 200.

The first row in the chart provides information about one fiber 12 and the second row marked "unit" refers to one subunit 10 that has four fibers 12. The measurements of ID (internal diameter) give the diameter of either the inside of a tube/micro-sheath that surrounds that layer or the hypothetical size of such layer. The OD (outside diameter) gives the diameter of either the outside of a tube/micro-sheath that surrounds that layer or the hypothetical size of such layer. It is noted that the first "6@1" that results in twenty eight fibers 12 defines the "six" subunits 12 "@1" subunit 12 that make up one subunit assembly 100 such as shown in FIG. 9. The next "6@1" in the following row (that shows one hundred and ninety six fibers 12) and the rows therebelow refer to subunit assemblies 100 arranged around one another to make the larger structures of cable 200.

TABLE 2

| 28 Fiber Subunit | # Fibers | ID (mm) | wall (mm) | OD (mm) | wall Inches | OD (inches) |
| --- | --- | --- | --- | --- | --- | --- |
| Fiber | 1 | | | 0.25 | | 0.010 |
| Unit | 4 | 0.60 | 0.1778 | 0.96 | 0.007 | 0.038 |
| 6@1 | 28 | 2.88 | 0.381 | 3.64 | 0.015 | 0.143 |
| 6@1 | 196 | 10.92 | 0.508 | 11.93 | 0.02 | 0.470 |
| 12@6@1 | 532 | 18.20 | 0.762 | 19.72 | 0.03 | 0.776 |
| 18@12@6@1 | 1036 | 25.48 | 1.016 | 27.51 | 0.04 | 1.083 |

As above, the polymer for jacket 202 may be selected from any of the available polymers listed above with respect to jackets 14 (of subunits 10) and micro sheath 102 (of subunit bundles 100). It is noted that FIG. 9 is a Cross section view, but subunit bundles 100 are helically stranded around one another in an assembly prior to the application of jacket 202. For example, in one arrangement, the lay length is between 3"+/−0.5" to 9"+/−0.5" with the 3" lay length used for subunits bundles 100 towards the center of cable 200 and slowly increasing for a typical max of 9" for subunit assemblies 100 towards the outer circumference of cable 200. Alternatively, a compatible form of SZ stranding may be used of subunit assemblies 100 of cable 200.

It is noted that helical stranding of subunit bundles 100 within cable 200 substantially renders a 95% or greater utilization of the glass's inherent usable strength of fiber 12 for the longitudinal strength of cable 200 itself. An SZ stranded grouping of subunit bundles 100 within cable 200 renders a 85% or greater utilization. With SZ stranding, the switchbacks in subunit assemblies 100 may slowly rotate out of stranding position over time and over temperature fluctuations. However, when such SZ stranding is used, additional binders, tapings or wrappings of subunit assemblies 100 can be held in a sufficiently stable position within cable 200.

Figure 10:
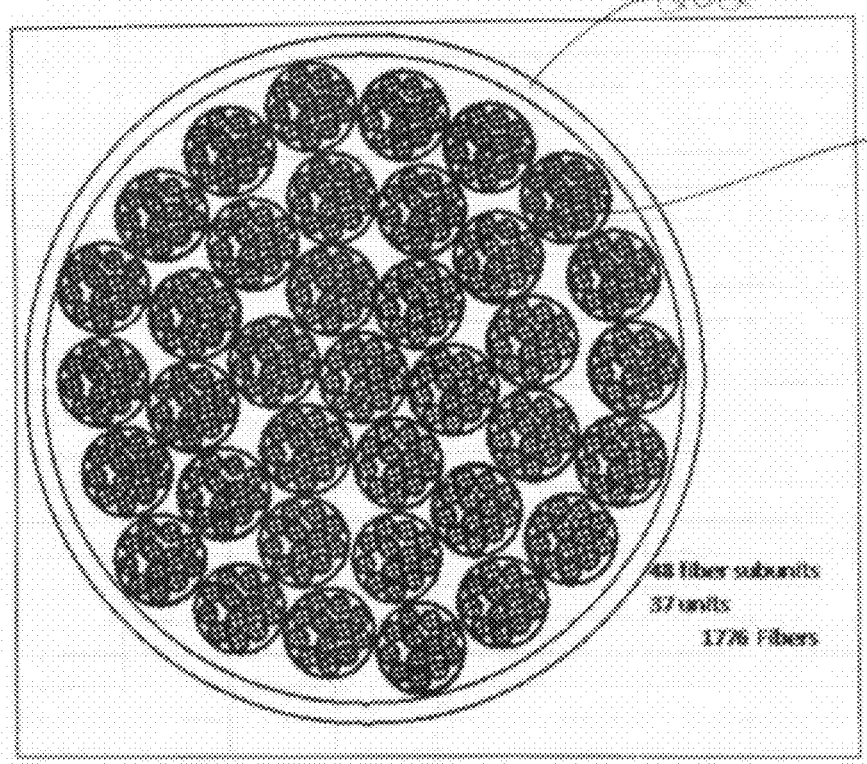

In another exemplary arrangement, FIG. 10 shows an exemplary cable 200 made from thirty seven fibers subunit bundles 100 each having forty eight fibers 12 therein, as per the example given in FIG. 6 above resulting cable 200 having one thousand seven hundred and seventy six fibers 12. The following table 3, combined with FIG. 10 shows the relevant concentric arrangement of subunit bundles 100 within a larger jacket 202 that forms the outer insulation of cable 200.

TABLE 3

| 48 Fiber Subunit | # Fibers | ID (mm) | wall (mm) | OD (mm) | wall Inches | OD (inches) |
| --- | --- | --- | --- | --- | --- | --- |
| Fiber | 1 | | | 0.25 | | 0.010 |
| Unit | 4 | 0.60 | 0.1778 | 0.96 | 0.007 | 0.038 |
| 9@3 | 48 | 2.88 | 0.381 | 3.64 | 0.015 | 0.143 |
| 6@1 | 336 | 10.92 | 0.508 | 11.93 | 0.02 | 0.470 |
| 9@3 | 576 | 16.06 | 0.762 | 17.59 | 0.03 | 0.692 |

TABLE 3-continued

| 48 Fiber Subunit | # Fibers | ID (mm) | wall (mm) | OD (mm) | wall Inches | OD (inches) |
|---|---|---|---|---|---|---|
| 12@6@1 | 912 | 18.20 | 0.762 | 19.72 | 0.03 | 0.776 |
| 18@12@6@1 | 1776 | 25.48 | 1.016 | 27.51 | 0.04 | 1.083 |

As with table 2, the first three rows show the stepped arrangement up to the "9@3" design of one subunit assembly 100 having forty eight fibers 12 as shown in FIGS. 6 and 10. The remaining rows are the arrangement of subunit assemblies 100 to form cable 200 as shown in FIG. 10.

Figure 11:
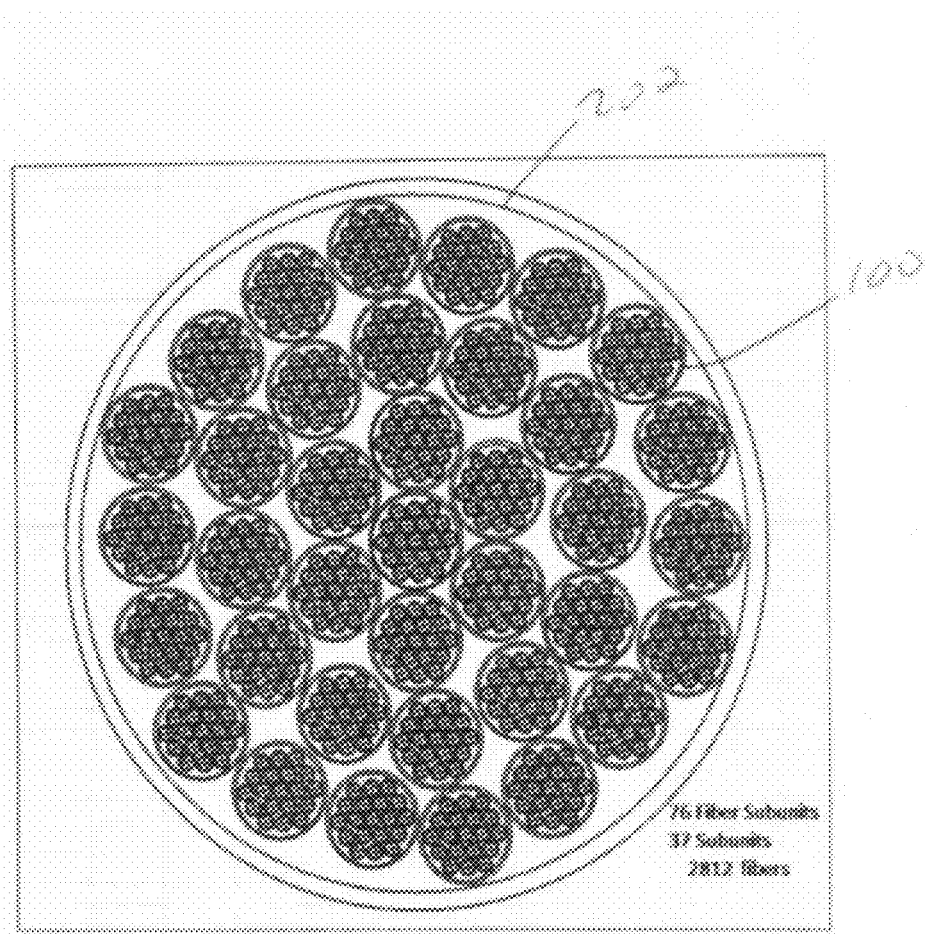

In another exemplary arrangement, FIG. 11 shows a cable 200 made from thirty seven fibers subunit bundles 100 each having seventy six fibers 12 therein, as per the example given in FIG. 7 above resulting in cable 200 having two thousand eight hundred and twelve fibers 12. The following table 4, combined with FIG. 11 shows the relevant concentric arrangement of subunit bundles 100 within a larger jacket 202 that forms the outer insulation of cable 200.

TABLE 4

| 76 Fiber Subunit | # Fibers | ID (mm) | wall (mm) | OD (mm) | wall Inches | OD (inches) |
|---|---|---|---|---|---|---|
| Fiber | 1 | | | 0.25 | | 0.010 |
| Unit | 4 | 0.60 | 0.1778 | 0.96 | 0.007 | 0.038 |
| 12@6@1 | 76 | 4.80 | 0.381 | 5.56 | 0.015 | 0.219 |
| 6@1 | 532 | 16.67 | 0.508 | 17.69 | 0.02 | 0.696 |
| 12@6@1 | 1444 | 27.79 | 0.762 | 29.31 | 0.03 | 1.154 |
| 18@12@6@1 | 2812 | 38.90 | 1.016 | 40.93 | 0.04 | 1.612 |

Figure 12:
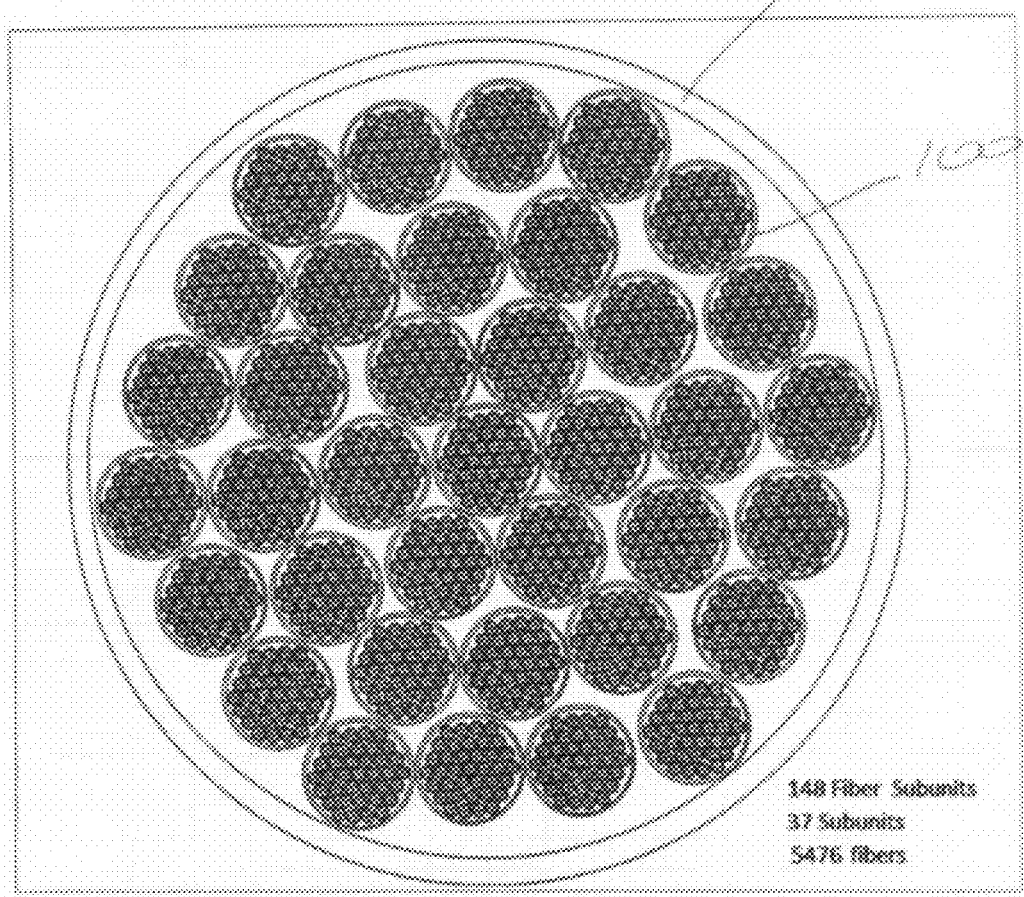

In another exemplary arrangement, FIG. 12 shows a cable 200 made from thirty seven fibers subunit bundles 100 each having one hundred and forty eight fibers 12 therein, as per the example given in FIG. 8 above resulting in cable 200 having five'thousand four hundred and seventy six fibers 12. The following table 5, combined with FIG. 12 shows the relevant concentric arrangement of subunit bundles 100 within a larger jacket 202 that forms the outer insulation of cable 200.

TABLE 5

| 148 F Subunit | # Fibers | ID (mm) | wall (mm) | OD (mm) | wall Inches | OD (inches) |
|---|---|---|---|---|---|---|
| Fiber | 1 | | | 0.25 | | 0.010 |
| Unit | 4 | 0.60 | 0.1778 | 0.96 | 0.007 | 0.038 |
| 18@12@6@1 | 148 | 6.71 | 0.381 | 7.48 | 0.015 | 0.294 |
| 6@1 | 1036 | 22.43 | 0.508 | 23.44 | 0.02 | 0.923 |
| 12@6@1 | 2812 | 37.38 | 0.762 | 38.90 | 0.03 | 1.532 |
| 18@12@6@1 | 5476 | 52.33 | 1.016 | 54.36 | 0.04 | 2.140 |

It is understood that the above arrangements as described in conjunction with FIG. 9-12 are only examples for cable 200. Any other arrangement of the different sized subunit bundles 100 may be devised and stranded within a larger jacket 200 in various concentric arrangements to arrive at cables having as little as one hundred and as many as five thousand plus fibers 12 and still be within the contemplation of the present invention.

As per the above arrangements, cables 200 having over five thousand fibers 12 may be condensed into an area of less than 2.25 inches (see Table 5) and having over one thousand fibers 12 in just over 1.0 inches (see Table 2).

It is also noted that in each of the above arrangements for cable 200 shown in FIGS. 9-12 there are no strength members. Because fibers 12 are so compactly arranged (while remaining just loose within their various jackets) together they act as longitudinal stress resistance member. For example, as noted above, a typical fiber 12 in cable 200, owing to its glass and matrix materials, is able to undergo about 430 grams of tension before reaching the 0.5% elongation point. When acting together, fibers 12 can thus withstand significant longitudinal stresses. For example in exemplary 336, 576, 912 and 1036 fiber count cables, according to the above construction, they may be respectively rated (for longitudinal strength within the attenuation limit (of 0.3 db as listed in table 1) at 300, 600, 800 and 1000 lbs rated cables 200 which is well within the acceptable range.

The ability of fibers 12 to act in concert with one another to provide longitudinal strength to cable 200 without undue attenuation is owed to the fact that cables 200 are structurally built up from four fiber subunits 10 which in turn are grouped into subunits bundles 100. Moreover, when subunits 10 are assembled, as well as during the cable assembly 200, control tensions for the assembly/jacket extrusions are within 10% and preferably between 0-5% with a 0-5% engagement slack.

For example, a line engineer making cables 200 use certain tensions/pulling weights to control the assembly of fibers 12, during the extrusion of jacket 14 for subunits 10. Likewise, during the creation of subunit assemblies 100, the fibers 12 and jackets 14 of subunits 10 are held and pulled at a longitudinal tension during the cabling operation to organize the elements of cable 200 and extrude jacket 202 thereon. During unit construction operations, the line engineer typically uses fiber tension setting of 50 to 150 grams (this is a range where all fibers 12 are set to the same tension with 5% tolerance typically, as in all set at 50 grams, 75 grams, 100 grams etc. . . . ), but preferable 100 grams+/−5 grams. During subunit assembly 100 unit assembly operations, the a unit 100 tension of 100 grams to 500 grams range is used, with a typical 200 gram+/−10 grams tension preferred. Basically, the end result is that fibers 12 are all the approximately same length to one another and relative to engagement in cable 200 under longitudinal pull force.

After a cable is assembled, and at a customer site cable installation, a "strain on fiber" of about 0.6% (elongation) under cable tensile stress is considered allowable. This is achieved in prior art arrangements at least in part with the use of strength members added to the cable, as noted above. However, cable 200 can meet such strain on fiber ratings without added strength members using the present construction of high fiber count combined with the balanced fiber strength utilization. This means that as fibers 12 are pulled during installation, they are on an individual basis pulled at an amount (of tension/force) that does not exceed a stress that would stretch fiber 12 more than 0.6% in length.

To ensure such tolerances, and the ability to meet such a 0.6% elongation, the equipment is actually set to an even tighter target tolerance (such as 0.54%) as fibers lengths may actually vary somewhat under cable construction scenarios. For example, fiber 12 length differentials may be at a 10% max difference owing to equipment limitations (or 5% from mid range—i.e. 95%). In other words, subtracting 5% (tolerance) from 0.6% (sstrain on fiber elongation target) twice or calculated approximately by taking 0.95 (95%)× 0.6%=0.57% then×0.95 again=0.54% approximately. In other words setting the strain on fiber target to 0.54% would still be sufficient to meet the desired 0.6% strain on fiber, even if the actual fiber lengths in some cases differed all the way up to +/−5%.

In another arrangement, to assist such cables 200 in being adjusted to standard fiber 12 coloring schemes, color yarns may be used on subunit assemblies 100. For example, in the cable shown in FIG. 9, (1036 fibers having unit of 37×28 fiber subassemblies 100) the arrangement may use a unique yarn identification where two blue yarns are wrapped around the first (inner) seven subunit assemblies 100 conforming with the first seven colors per TIA industry standard. Thereafter two orange yarns may be wrapped around the next twelve (middle) subunit assemblies 100 in the next layer with the final eighteen subunit assemblies 100 (outer) using the first twelve TIA colors and then the first six TIA colors with dashed markings. This final eighteen subunit assemblies 100 (outer) can be further differentiated by being wrapped in green identification yarns. In other words, in addition to traditional marking of multi-fiber units, the three stages/layers of the subunit assemblies 100 in exemplary cable 200 of FIG. 9 could be differentiated by blue yarns over the inner layer of seven subunit assemblies 100, orange over the middle layer of twelve subunit assemblies 100 and green over the third outer layer of subunit assemblies 100. Thus, when the thirty seven subunit assemblies 100 are laying on a table a tug on one of the yarns pulls a sub set away from the rest for identification.

Additionally, the colors within the subunits 10 may follow consecutively the twelve colors per TIA (Telecommunication Industry Association) in four fiber 12 increments or may follow another scheme using an expanded sixteen color scheme, as needed by the customer. Alternatively the colors within subunits 10 could be staggered to uniquely identify a subunit 10 when matched with the jacket color without requiring yarns as shown in FIG. 13.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A fiber optic cable, said cable comprising:
    a plurality of optical fiber subunits, each of said subunits including four fiber optic elements and an enclosing jacket, wherein said fiber optic elements in said plurality of fiber subunits, maintain an elongation range of 0.5%-1.0% without exceeding 0.30 db of attenuation;
    a plurality of optical fiber subunit assemblies, each of which include a plurality of said optical fiber subunits and an enclosing micro-sheath;
    said subunit assemblies stranded helically around one another; and
    a sheath enclosing said plurality of optical fiber subunit assemblies, said cable constructed without added strength elements,
    wherein said cable is constructed such that when installed, and when said fiber optic elements are pulled, that stresses applied to said fiber optic elements result in said fiber optic elements not stretching more the 0.6% in length.

2. The fiber optic cable as claimed in claim 1, wherein the polymer used for any one of said jacket, micro-sheath and sheath, is selected from the group consisting of PVDF (Polyvinylidene Fluoride), PEP (Fluorinated Ethylene Polymer), polypropylene (PP), FRPVC (Fire Resistant Polyvinyl Chloride), polyethylene (PE), BHBD (bishydroxydeoxybensoin), PPDC (polyphosphonates), and mixtures thereof.

3. The fiber optic cable as claimed in claim 1, wherein said jacket of said fiber optic subunit has a thickness of substantially 0.003-0.0075".

4. The fiber optic cable as claimed in claim 3, wherein the gap between said fiber optic elements, and said jacket of said fiber optic subunit is in the range of 0.00063"-0.0002".

5. The fiber optic cable as claimed in claim 1, wherein said fiber optic elements within said jacket of said fiber optic subunit are coated with a release agent.

6. The fiber optic cable as claimed in claim 5, wherein said release agent, is selected from the group consisting of dichlorofluoroethane and silicone.

7. The fiber optic cable as claimed in claim 1, wherein said plurality of said optical fiber subunits within said enclosing micro-sheath of said optical fiber subunit assemblies are arranged in a six around one arrangement.

8. The fiber optic cable as claimed in claim 1, wherein said plurality of said optical fiber subunits within said enclosing micro-sheath of said optical fiber subunit assemblies are arranged in a nine around three arrangement.

9. The fiber optic cable as claimed in claim 1, wherein said micro-sheath of said fiber optic subunit assemblies has a thickness of substantially 0.003-0.007".

10. The fiber optic cable as claimed in claim 1, wherein all of said fiber optic elements within said cable are cabled and arranged in such a manner and are within a length differential tolerance of one another such that under a longitudinal stress situation, all fibers engage substantially simultaneously, so that a longitudinal stress rating of said cable as a whole is supported by said fiber optic elements themselves without additional strength members.

11. The fiber optic cable as claimed in claim 1, wherein said plurality of optical fiber subunit assemblies, each have any one of four, seven, twelve, nineteen or thirty seven optical fiber subunits resulting in each of said optical fiber subunit assemblies having sixteen, twenty eight, forty eight, seventy six and one hundred and forty eight optical fibers respectively.

12. The fiber optic cable as claimed in claim 11, wherein said plurality of optical fiber subunit assemblies having twenty eight, forty eight, seventy six and one hundred and forty eight optical fibers respectively are combined to form cables having one thousand thirty six, one thousand seven hundred and seventy six, two thousand eight hundred and twelve and five thousand four hundred and seventy six optical fibers respectively.

13. The cable as claimed in claim 1, wherein said cable uses a color scheme of twelve colors for said optical fibers as per the standard TIA (Telecommunication Industry Standard) color scheme.

14. The cable as claimed in claim 13, wherein each of said optical fibers in said cable includes one color and wherein said enclosing jacket of said fiber optic subunit also includes at least one color.

15. The cable as claimed in claim 1, wherein said cable uses an expanded color scheme of sixteen colors for said optical fibers and enclosing jacket of said fiber optic subunit using solid colors and color-dashed markings.

* * * * *

UNITED STATES PATENT AND TRADEMARK OFFICE
CERTIFICATE OF CORRECTION

PATENT NO. : 8,494,327 B2
APPLICATION NO. : 12/907372
DATED : July 23, 2013
INVENTOR(S) : Keller et al.

Page 1 of 1

It is certified that error appears in the above-identified patent and that said Letters Patent is hereby corrected as shown below:

In the Claims

Column 9, Claim 2, Line 59: The term "PEP" between the words "(Polyvinylindene Fluoride)," and "(Fluorinated Ethylene Polymer)," should be changed to "FEP"

Signed and Sealed this
Twenty-fourth Day of September, 2013

Teresa Stanek Rea
*Deputy Director of the United States Patent and Trademark Office*